123,603

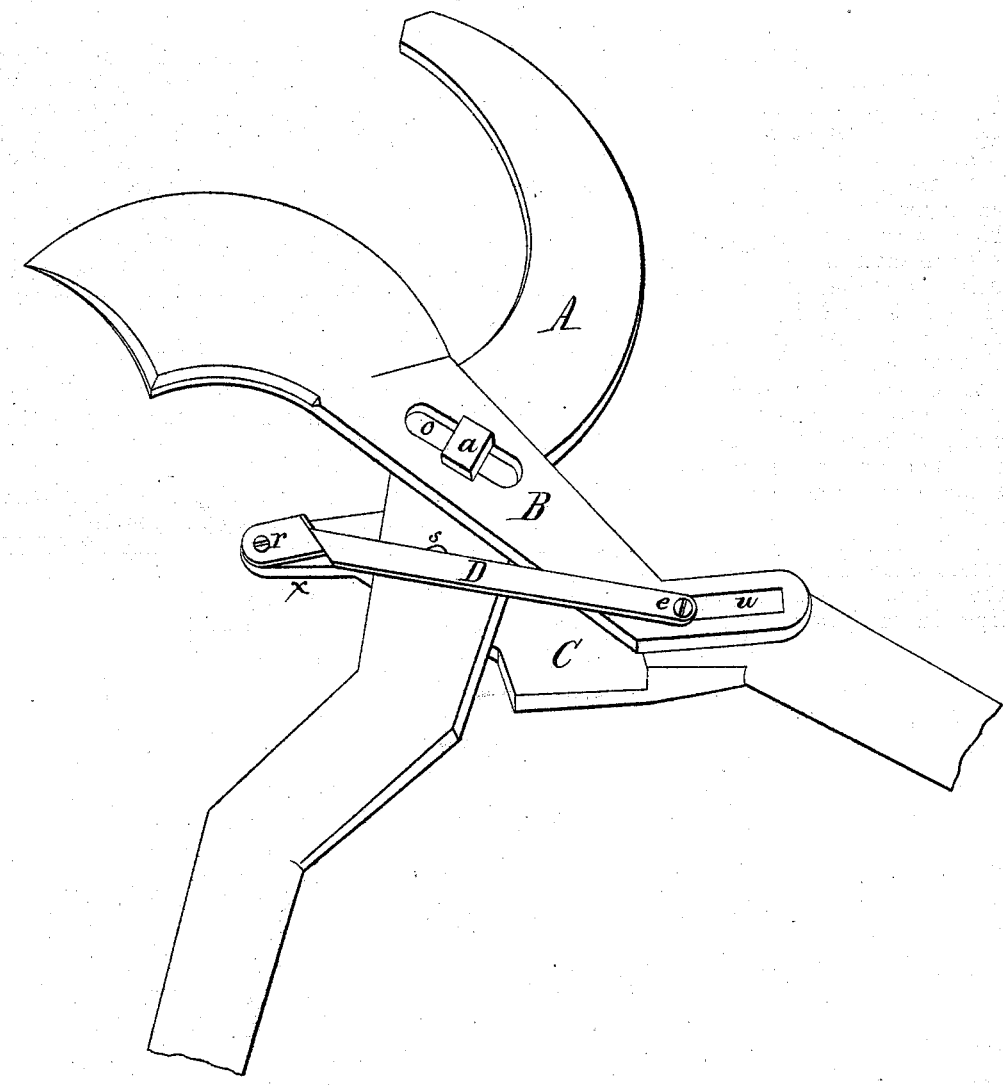

UNITED STATES PATENT OFFICE.

REUBEN HALL, OF CLYDE, OHIO.

IMPROVEMENT IN PRUNING-SHEARS.

Specification forming part of Letters Patent No. 122,603, dated January 9, 1872.

SPECIFICATION.

I, REUBEN HALL, of Clyde, in the county of Sandusky and State of Ohio, have invented certain Improvements in Pruning-Shears, of which the following is a specification:

In the accompanying drawing, A is a concave jaw with shank. B is a convex cutting-blade with two slots, $o$ and $u$. C is a shank with an extension, $x$. D is a link. $a$ and $e$ are bolts. $a$ is the fulcrum-bolt passing through slot $o$ in blade B into jaw A. Shank C is pivoted to jaw at $s$. $x$ is an extension of shank C, to which link D is pivoted. Link D passes back on the opposite side from shank C, and is bolted to shank C, with bolt $e$ passing through slot $u$ of blade B. Shank C and link D form a support and guide for jaw A and blade B to secure firmness and prevent lapping of the jaw and blade.

I do not claim the slot as new; but as heretofore made the slot has to be very long to let the shears open far enough to receive a large limb in the jaw near the fulcrum, by which means the blade is thrust out too far and the limb is grasped by the jaw and heel of the blade where it is impossible to have an edge on the blade, and consequently the bark is torn off and the limb much bruised; but with a short slot, $o$, the blade is thrust out no further than to bring the edge of the blade in the best position to commence to cut, and by the slot $u$ the shears will open far enough to receive a large limb near the fulcrum, and cut with great ease.

Claim.

1. I claim the combination of the slots $o$ and $u$ in the blade B, substantially as shown and described.

2. I claim the combination of jaw A, blade B, shank C, link D, slots $o$ and $u$, with bolts $a$ and $e$, substantially as specified.

REUBEN HALL.

Witnesses:
 MILO HUNTER,
 B. O. BRIGHAM. (44)